UNITED STATES PATENT OFFICE.

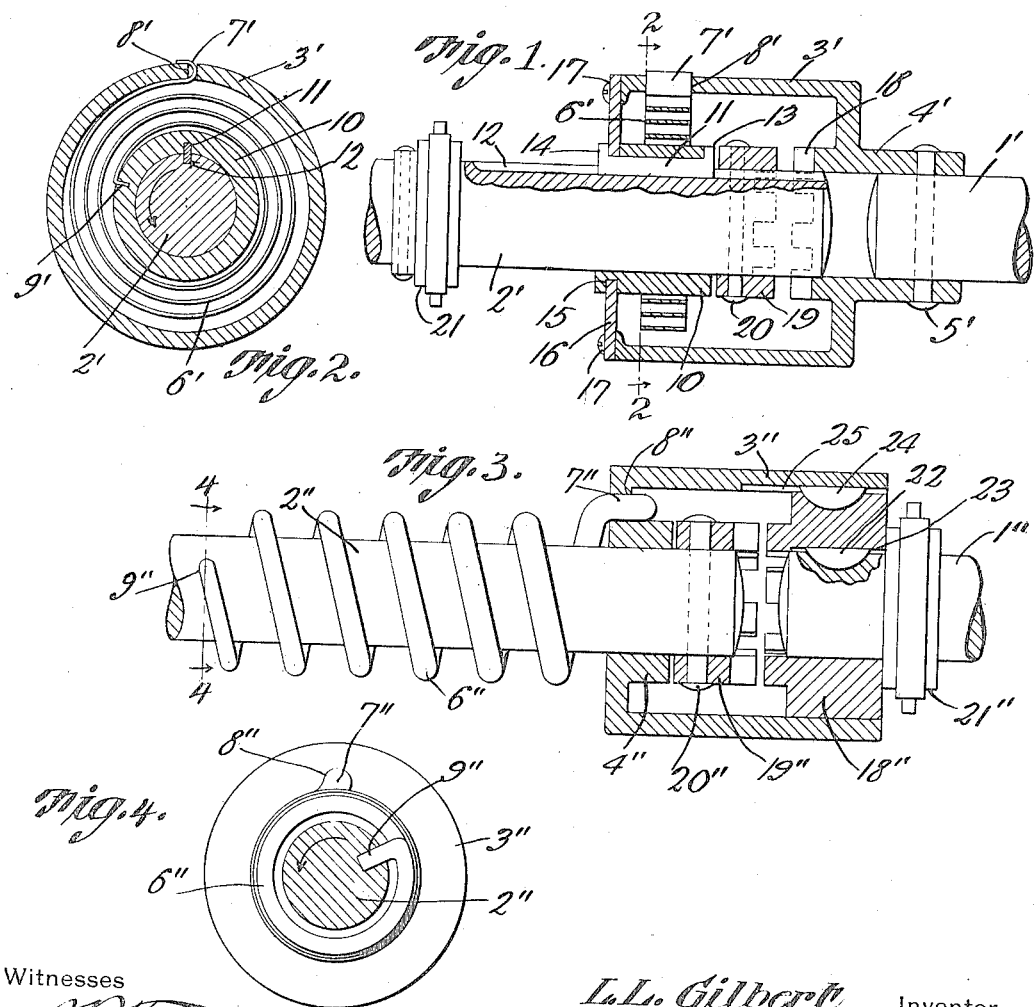

LEVI L. GILBERT, OF BOULDER, COLORADO.

YIELDABLE SHAFT-COUPLING.

1,196,349.   Specification of Letters Patent.   Patented Aug. 29, 1916.

Application filed December 13, 1915. Serial No. 66,560.

*To all whom it may concern:*

Be it known that I, LEVI L. GILBERT, a citizen of the United States, residing at Boulder, in the county of Boulder and State of Colorado, have invented a new and useful Yieldable Shaft-Coupling, of which the following is a specification.

The present invention is a yieldable coupling or connection for use in a driving shaft, for instance, in the driving shaft of a motor vehicle between the internal combustion engine and transmission mechanism, although the device can be used for divers other purposes, and it is the object of the invention to provide novel yet simple and effective means for yieldably connecting a pair of shafts or shaft sections whereby one may be yieldably actuated by the other, to avoid such objections, as shocks and jars, stripping of gears, and the like, since although the driving shaft is permitted to rotate by a quick action, a jerky action of the driven shaft will not result, since the yieldable connection will be brought under tension to gradually rotate the driven shaft and bring the speed of rotation thereof up to the speed of rotation of the driving shaft. If the present device is used in a motor vehicle, it will eliminate the usual operation of the clutch for gradually connecting the driven mechanism with the engine, and the present device when used will therefore reduce the wear and tear of the clutch, as well as the transmission mechanism or other mechanism driven. With the use of the present contrivance, the clutch can be thrown in full to connect the driving shaft with the engine without the slipping movement of the clutch members relative to one another (referring to the ordinary clutch of a motor vehicle) and the driven shaft will be gradually started and brought up to the speed of rotation of the driving shaft, with a smooth accelerated movement.

It is within the scope of the invention to provide a device of the nature indicated which is novel and improved in its construction, without entailing a complicated or expensive structure, and whereby the device is thoroughly practical, reliable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a sectional view of the invention. Fig. 2 is a sectional view on the line 2—2 of Fig. 1. Fig. 3 is a sectional view of a modified form. Fig. 4 is a sectional view on the line 4—4 of Fig. 3.

In the form illustrated in Figs. 1 and 2, the driven and driving shafts 1' and 2' are in alinement and have their adjacent ends fitted within the hub 4' of the cup-shaped member 3', the hub 4' being secured, as at 5', to the end of the shaft 1', while the end of the shaft 2' is rotatable within the hub 4'. A convolute spring 6' has its outer end hooked or otherwise engaged, as at 7', through a slot 8' in the rim of the member 3', and the inner end of the spring 6' is engaged rigidly, as at 9', with a sleeve 10 feathered upon a driving shaft 2'. A longitudinal feather 11 is engaged with the sleeve 10 and works within a longitudinal featherway 12 with which the shaft 2' is provided, to constrain the sleeve 10 to rotate with the shaft 2', but to allow said shaft to be slid longitudinally to and from the driven shaft 1'. The inner end of the feather 11 has an outstanding lug 13 bearing against the inner end of the sleeve 10, and the outer end of said feather is provided with an outstanding lug 14 to prevent the inward movement of the feather. The sleeve 10 is provided adjacent its outer end with an annular groove 15 in which is fitted an annular plate 16 secured, by means of screws 17 or otherwise, to the rim of the member 3'. The sleeve 10 is therefore held against longitudinal movement relative to the member 3', although the sleeve 10 can rotate relative to said member 3'. The inner end of the hub 4' is provided with a clutch member 18, and a clutch collar 19 is secured, as at 20, upon the shaft 2' within the member 3', said collar 19 and clutch member 18 being toothed so as to interengage when the shaft 2' is slid inwardly. The shaft 2' may be slid longitudinally in any suitable manner, as by a loose collar 21 thereon and operated by a lever or other means (not shown).

When the shaft 2' is slid outwardly to disengage the clutch collar 19 from the clutch member 18, the shaft 2' in being rotated in the direction of the arrow Fig. 2, will bring the spring 6' under tension for rotating the shaft 1' yieldably at first, and then positively after the speed of rotation of the shaft 1' is increased to that of the shaft 2'. When it is desired to operate the shaft positively from the shaft 2', the shaft 1' is slid inwardly to engage the collar 19 with the clutch member 18, in which event the shafts are positively connected, as will be apparent. The shaft 2' can readily slide relative to the sleeve 10, but said sleeve is rotated with the shaft 2' and is held against longitudinal movement relative to the member 3'. Therefore when the clutch members are separated, the spring 6' will be just as effective as the spring 6 in the first form above described.

Coming to the variation illustrated in Figs. 3 and 4, the same embodies the general principles of the structure illustrated in Figs. 1 and 2, but there are a number of changes in details. The driven shaft 1" is in alinement with the driving shaft 2", and the cup-shaped member 3" has its hub 4" rotatable upon the driving shaft 2". A helical or coiled spring 6" is used in this case, the spring surrounding the shaft 2" and having one end engaged through, as at 7", an aperture 8" in the bottom portion of the member 3" to connect said end of the spring rigidly with the member 3". The other end of the spring 6" is engaged rigidly, as at 9", with the shaft 2". In this instance, the spring increases in thickness or cross section from the end which is attached to the driving shaft to the other end which is attached to the member 3", and this idea may also be used with the springs 6 and 6', if desired, although the springs may be either of uniform or increased cross section from end to end, whichever is desired. With the use of the spring, as illustrated in Fig. 3, the tension of the spring is accelerated, as the spring is wound up, since the further the spring is wound up, the greater will be the resistance offered, at an accelerated rate.

An annular clutch member 18" is splined within the rim of the member 3" and is provided with clutch teeth coöperable with the clutch teeth of the clutch collar 19" secured, as at 20", upon the inner end of the driving shaft 2". The end of the driven shaft 1" is splined within the clutch member 18", and to this end, a spline 22 is secured to the shaft 1" and works within a longitudinal inner groove 23 with which the member 18" is provided. The member 18" has engaged with its periphery a spline 24 working in a longitudinal groove 25 with which the inner surface of the member 3" is provided. The clutch member 18" is thus slidable relative to the shaft 1" and member 3", but all three parts rotate together. The outer side of the clutch member 18" has means 21" whereby it can be moved longitudinally into and out of engagement with the clutch collar 19", thus enabling the shafts to be positively connected when desired. When the shafts are disconnected, the strain is transmitted from the shaft 2" to the shaft 1" by way of the spring 6", thereby providing the advantages of the springs 6 and 6' above described.

The foregoing and other arrangements can be utilized for the purposes of the invention, within the scope of what is claimed, without departing from the spirit of the invention.

Having thus described the invention, what is claimed as new is:

1. In combination, a driving and a driven shaft, means for positively connecting said shafts whereby the driven shaft is rotated positively by the driving shaft, and spring means connected to said shafts whereby when said means is inoperative the spring means yieldably advances the driven shaft when the driving shaft is rotated.

2. In combination, alining driving and driven shafts, clutch means for positively connecting them whereby the driven shaft is rotated positively by the driving shaft, and a spring connection between the shafts whereby when the clutch means is inoperative, the spring means is operative for advancing the driven shaft yieldably when the driving shaft is rotated.

3. In combination, alining driving and driven shafts, an annular member rotatable with the driven shaft and surorunding the driving shaft, a spring connecting said member and driving shaft to be wound up when the driving shaft is rotated, and clutch means within said member for positively connecting and disconnecting the adjacent ends of said shafts.

4. In combination, alining driving and driven shafts, clutch members carried by the adjacent ends thereof and adapted to be interengaged for positively connecting said shafts, and spring means independent of the clutch members and connected to said shafts whereby when the clutch members are separated, the spring means is operative to yieldably advance the driven shaft when the driving shaft is rotated.

5. In combination, alining driving and driven shafts, a cup-shaped member having a central hub fitted and secured upon the end of one of said shafts, the end of the other shaft fitting rotatably in said hub, said hub having a clutch portion, a clutch member carried by the second mentioned shaft to engage and disengage the clutch portion when the second mentioned shaft is slid relative to the first mentioned shaft, a sleeve slidable upon the second mentioned shaft, and a spiral spring having its outer end connected to the rim of said member and having its inner end connected to said sleeve.

In testimony that I claim the foregoing as my own, I have hereto affixed my signature in the presence of two witnesses.

LEVI L. GILBERT.

Witnesses:
 PAULINE BODRERO,
 JAMES O. MOORE.